J. Klingensmith.
Churn.
No. 97,413. Patented Nov. 30, 1869.
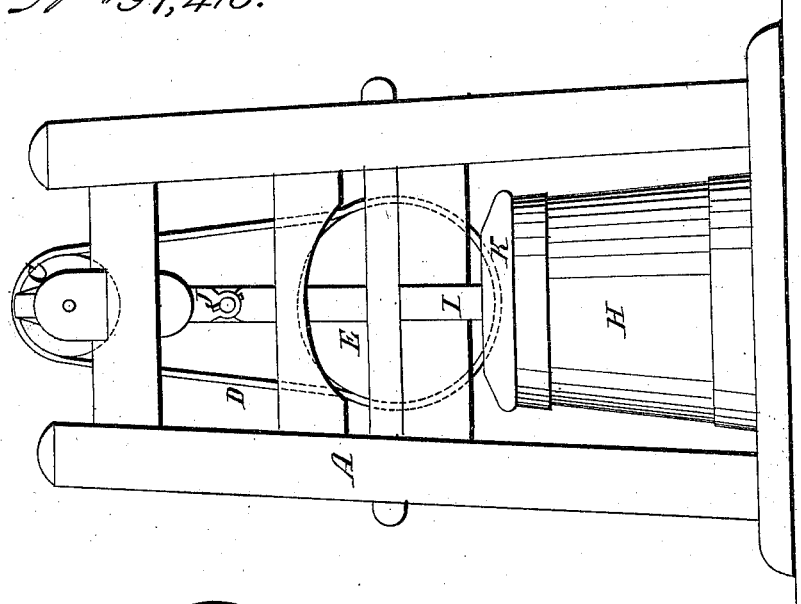
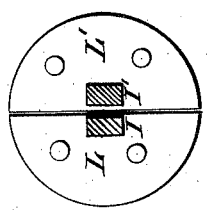
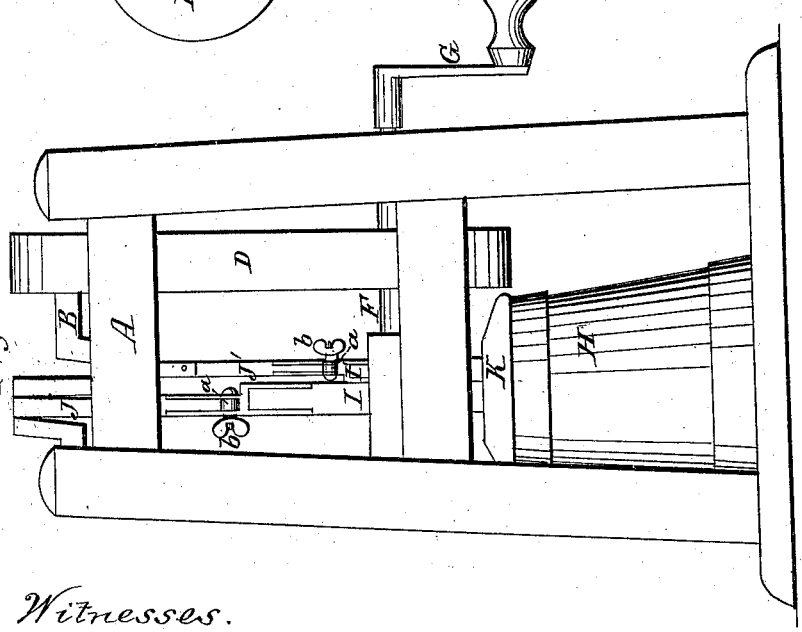
Witnesses.
J. H. Burridge
Frank P. Alden.
Inventor.
J. Klingensmith.

United States Patent Office.

JACOB KLINGENSMITH, OF WARREN, OHIO.

Letters Patent No. 97,413, dated November 30, 1869.

IMPROVEMENT IN CHURNS.

The Schedule referred to in these Letters Patent and making part of the same

*To all whom it may concern:*

Be it known that I, JACOB KLINGENSMITH, of Warren, in the county of Trumbull, and State of Ohio, have invented certain new and useful Improvements in Churns; and I do hereby declare that the following is a full and complete description of the same, reference being had to the accompanying drawings, making a part of this specification, in which—

Figure 1 is a side view of the churn.
Figure 2, a view of the front.
Figure 3, detached section.

Like letters of reference refer to like parts in the several views.

The purpose of this invention is to operate the dashers of a churn by means of a crank and pulleys, and the means employed for forming the jointed connection of the cranks with the sectional dasher, so as to form a ready mode of attachment and detachment, as hereinafter set forth, thereby reducing the labor of churning, and effecting the process in a much shorter time than by the use of the ordinary hand-churn.

In the drawing—

A represents a frame of wood, in the top of which is journalled the crank-shaft B.

On said shaft is secured a pulley, C, fig. 2, around which proceeds a belt, D, to the pulley E, on the shaft F, and whereby it is operated by the crank G, as will hereinafter be shown.

On the floor of the frame is placed and secured the churn H, which is or may be of the ordinary description.

Said churn is provided with a double dasher, of which I I' are the handles or stems, and which are connected to the cranks of the shaft B by means of the links J J'.

The immediate connection of the handles to the links is made by a hinged joint, $a$, the pivot of which is secured in place by a thumb-screw nut, $b$, so that the handles can be disconnected from the links for the removal of the churn with ease and facility.

The dasher is perforated, and composed of two sections, L L', fig. 3, each forming a semicircle or nearly so. To one section is connected the handle I, and to the other the handle I', causing the sections to act reversely to each other when in operation.

The practical operation of this churn is as follows:

The cream on being thrown therein, which may be done by lifting the cover K, is then agitated by the sectional dashers, actuated by means of the crank G, referred to, which in turn operates the crank-shaft B, to which the dashers are connected by means of the links aforesaid, thereby giving to them a quick reciprocating and alternating action, which violently agitates the cream, and doing the work of churning in a short time.

I am aware that an alternating crank-action has been applied to this class of churns. This I do not claim; but That which I claim, and desire to secure by Letters Patents, is—

The arrangement of the double cranks with the jointed links J J', provided with thumb-screws or nuts, in combination with the sectional dasher and churn, operating conjointly in the manner and by the means substantially as described.

JACOB KLINGENSMITH.

Witnesses:
E. R. WISE,
W. T. SPEAR.